United States Patent
Otera

(10) Patent No.: US 6,914,616 B2
(45) Date of Patent: Jul. 5, 2005

(54) IMAGE REPRODUCTION DISPLAY APPARATUS UTILIZING A CONTROLLER WITH SELECTION MASK CONVERSION MODULE

(75) Inventor: Atsushi Otera, Shiojiri (JP)

(73) Assignee: Seiko Epson Corporation, Tokyo (JP)

(*) Notice: Subject to any disclaimer, the term of this patent is extended or adjusted under 35 U.S.C. 154(b) by 79 days.

(21) Appl. No.: 09/982,929

(22) Filed: Oct. 22, 2001

(65) Prior Publication Data

US 2002/0057386 A1 May 16, 2002

(30) Foreign Application Priority Data

Oct. 31, 2000 (JP) ........................................ 2000-332646

(51) Int. Cl.[7] .............................. G09G 5/02; H04N 9/31; H04N 1/40; G06K 9/34
(52) U.S. Cl. ...................... 345/629; 358/455; 358/3.23; 382/173; 382/180; 345/690; 348/744
(58) Field of Search ................................. 345/629, 690; 382/173–180; 348/744, 578; 358/455

(56) References Cited

U.S. PATENT DOCUMENTS

| | | | |
|---|---|---|---|
| 4,868,884 A | * 9/1989 | Miyazaki et al. | ........... 382/283 |
| 5,060,280 A | 10/1991 | Mita et al. | |
| 5,165,070 A | 11/1992 | Koyama et al. | |
| 5,222,159 A | * 6/1993 | Kawamura et al. | ......... 382/283 |
| 5,363,483 A | * 11/1994 | Jones et al. | .................. 345/766 |
| 5,398,309 A | 3/1995 | Atkins et al. | |
| 5,977,960 A | 11/1999 | Nally et al. | |
| 5,982,381 A | * 11/1999 | Joshi et al. | .................. 345/629 |
| 2002/0071140 A1 | * 6/2002 | Suzuki et al. | ............... 358/455 |
| 2002/0089518 A1 | * 7/2002 | Shigeta | ....................... 345/629 |

FOREIGN PATENT DOCUMENTS

| | | |
|---|---|---|
| JP | A-10-62865 | 3/1989 |
| JP | 03-267885 | 11/1991 |
| JP | 08-030258 | 2/1996 |
| JP | A-9-258708 | 10/1997 |
| JP | A 2000-125191 | 4/2000 |

* cited by examiner

*Primary Examiner*—Matthew C. Bella
*Assistant Examiner*—Anthony J Blackman
(74) *Attorney, Agent, or Firm*—Oliff & Berridge PLC

(57) ABSTRACT

An image display apparatus of the present invention includes an image display unit and an image reproduction module that generates display video data, which is to be displayed on the image display unit. The image reproduction module has an image transition controller that uses a predetermined image selection mask to process a first image and a second image and thereby generate the display video data in the case of changing display on the image display unit from the first image to an image including the second image in at least part of a display area of the first image. The image transition controller includes: a storage module that stores therein the first image, the second image, and a base selection mask having an image area of a smaller size than the at least part of the display area; and a selection mask conversion module that converts the base selection mask into the image selection mask having an image area of an identical size with the at least part of the display area. This arrangement ensures high-speed image transition.

3 Claims, 13 Drawing Sheets

IMAGE A (128 × 96)

IMAGE B (128 × 96)

MASK 1 (32 × 32)

AREA 1

MASK 2 (32 × 32)

AREA 1, AREA 2, 8, 16, 16, 8, AREA 2

MASK 3 (32 × 32)

AREA 1, AREA 2, 16, 16, 16, 16, 16, 16, 16, 16, AREA 2, AREA 1

MASK 4 (32 × 32)

8, AREA 1, 16, 16, 8, AREA 2, AREA 1

MASK 5 (32 × 32)

AREA 2

⇩ 4 TIMES IN HORIZONTAL DIRECTION
6 TIMES IN VERTICAL DIRECTION

4 TIMES IN HORIZONTAL DIRECTION
3 TIMES IN VERTICAL DIRECTION

IMAGE A(128 × 96)

IMAGE B(64 × 48)

⬇ 2 TIMES IN HORIZONTAL DIRECTION
2 TIMES IN VERTICAL DIRECTION

⬇ MULTIPLY BY 3/4 TIMES
IN VERTICAL DIRECTION

IMAGE REPRODUCTION DISPLAY APPARATUS UTILIZING A CONTROLLER WITH SELECTION MASK CONVERSION MODULE

BACKGROUND OF THE INVENTION

1. Field of the Invention

The present invention relates to transition control of images displayed with an image display apparatus.

2. Description of the Related Art

Projectors for projecting and displaying images (projection-type display apparatuses) are widely used in various presentations. The projector causes a personal computer (hereinafter referred to as 'PC') to execute software for supporting presentation (hereinafter referred to as the 'presentation tool'), and reproduces and displays an image expressed by video data in data prepared in advance for presentation (hereinafter referred to as the 'presentation data'). One typical example of the presentation tool is PowerPoint (registered trademark) by Microsoft Inc.

Some recently developed projectors do not utilize the PC functioning as the image reproduction apparatus (player) but are self-contained to perform presentation. Such a projector is hereinafter referred to as the 'projector with the player'. The projector with the player has an interface communicable with a memory card like a PC card and enables display of an image expressed by video data included in presentation data stored in the memory card.

The player mounted on the projector is not the PC executing the software program PowerPoint but only has the restricted function to reproduce an image expressed by video data included in the presentation data stored in the memory card. For example, the player displays the respective images expressed by the video data stored in the memory card on the basis of the JPEG or BMP format as individual slides.

The software program PowerPoint is capable of specifying diverse display effects (hereinafter may also be referred to as 'image transition effects') in the process of switching over the slides to draw attention in the presentation. The display effects depend upon how a resulting display image (image C) is generated in the course of changing the display from a current on-screen image (image A) to a next on-screen image (image B). More specifically, the display effects depend upon the selection for a pixel 'c' of the image C, that is, which of a pixel 'a' included in the image A, a pixel 'b' included in the image B, and an operation result of the pixels 'a' and 'b' is set to the pixel 'c' of the image C. Such display effects include animation effects like fade-in, fad-out, slide-in, wipe, and blind.

The projector with the player has a hardware configuration in the player for selecting the output video data with regard to each pixel, based on the mask data having the identical size with that of the output video data. This attains the similar display effects to those attained by the software program PowerPoint.

The prior art projector with the player uses the mask data having the same size as that of the video data and thus requires a large storage capacity for storing the mask data. Multiple mask data are generally required to attain one display effect, and this causes further expansion of the required storage capacity. The expansion of the required storage capacity undesirably increases the frequency of access to the memory for rewriting the mask data. This results in heavy load applied to a CPU that gains access to the memory and interferes with the high-speed processing. This problem is common to any image display apparatuses exerting similar display effects.

SUMMARY OF THE INVENTION

The object of the present invention is thus to provide a technique that ensures higher-speed image transition than the prior art technique.

At least part of the above and the other related objects is attained by an image display apparatus, which includes: an image display unit; and an image reproduction module that generates display video data, which is to be displayed on the image display unit. The image reproduction module has an image transition controller that uses a predetermined image selection mask to process a first image and a second image and thereby generate the display video data in the case of changing display on the image display unit from the first image to an image including the second image in at least part of a display area of the first image. The image transition controller includes: a storage module that stores therein the first image, the second image, and a base selection mask having an image area of a smaller size than the at least part of the display area; and a selection mask conversion module that converts the base selection mask into the image selection mask having an image area of an identical size with the at least part of the display area.

In the image display apparatus of the present invention, the technique converts the base selection mask having a smaller image area than the at least part of the display area of the first image, in which the second image is displayed, into the image selection mask having an image area of the identical size with the at least part of the display area, and applies the converted image selection mask to process the first image and the second image, thereby generating the display video data. This arrangement desirably reduces the storage capacity required for storing the base selection mask, compared with the storage capacity required for storing the selection mask in the prior art technique, thus ensuring the higher-speed image transition.

Here 'to process the first image and the second image' is not restricted to mixing the first image with the second image but includes selection of one image in at least part of the display area of the other image.

For example, the selection mask conversion module may obtain the image selection mask through expansion/contraction of the base selection mask. In another example, the selection mask conversion module may obtain the image selection mask by setting the base selection mask as one block data and repeating the block data in a two-dimensional manner. In still another example, the selection mask conversion module may obtain the image selection mask by combining the expansion/contraction with the repeating layout.

In accordance with another preferable application of the image display apparatus, the image reproduction module further includes an interface that is capable of reading data stored in a portable recording medium. At least one of video data representing the first image and the second image is read from a recording medium connected to the interface.

This arrangement enables the video data to be read from a recording medium and displayed on the image display unit.

DESCRIPTION OF THE PREFERRED EMBODIMENTS

An image display apparatus according to the present invention is discussed below as a preferred embodiment with reference to drawings.

A. Structure of Projector

Figure 1:
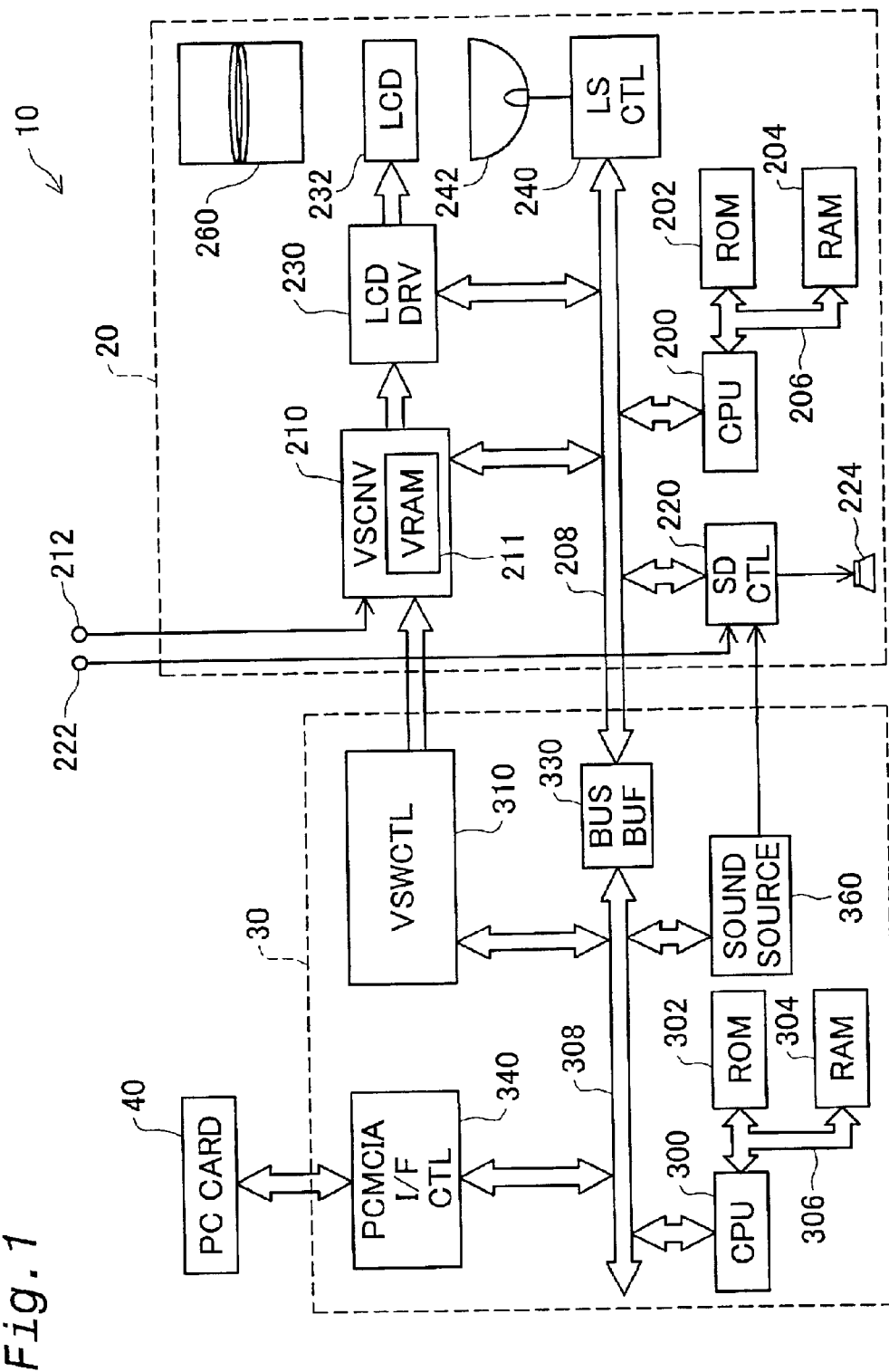
FIG. 1 is a block diagram schematically illustrating the structure of a projector 10 in one embodiment of the present invention

FIG. 1 is a block diagram schematically illustrating the structure of a projector 10 in one embodiment of the present invention. The projector 10 includes a projector module 20 functioning as an image display module and an image reproduction module 30.

The projector module 20 has a first CPU 200 that executes predetermined programs to control respective blocks included in the projector module 20, a first ROM 202 that stores therein the programs executed by the first CPU 200, and a first RAM 204 that temporarily registers therein results of the operations executed by the first CPU 200 and data. The first CPU 200, the first ROM 202, and the first RAM 204 are mutually connected via a memory bus 206.

The projector module 20 further includes a video signal conversion circuit (VSCNC) 210, an audio control circuit (SDCTL) 220, a liquid crystal panel driving circuit (LCDDRV) 230, a light source control circuit (LSCTL) 240, and a projection optical system 260. The video signal conversion circuit 210, the audio control circuit 220, the liquid crystal panel driving circuit 230, and the light source control circuit 240 are connected to the first CPU 200 via a first system bus 208.

The video signal conversion circuit 210 exerts analog-to-digital conversion, decoding, synchronizing signal separation, and image processing functions. More concretely, the video signal conversion circuit 210 converts analog video signals input from an external video signal input terminal 212 into digital video data, and writes the converted digital video data into a frame memory (VRAM) 211 included in the video signal conversion circuit 210 or reads the digital video data from the frame memory 211 in synchronism with a synchronizing signal. Typical examples of the input analog video signals include RGB signals output from a personal computer and composite video signals output from a video cassette recorder. In the case where the analog video signal is a composite video signal, the video signal conversion circuit 210 demodulates the composite video signal, separates a component video signal consisting of three color signal components RGB from a synchronizing signal included in the composite video signal, and converts the component video signal into digital video data. In the case where the analog video signal is an RGB signal output from the personal computer, on the other hand, the synchronizing signal separation is not required, since the RGB signal is input as a component video signal separately from the synchronizing signal. The video signal conversion circuit 210 thus simply converts the component video signal into digital video data.

The video signal conversion circuit 210 also receives digital video data output from the image reproduction module 30. In this case, neither the analog-to-digital conversion nor the synchronizing signal separation is required, since the digital video signal is supplied separately from the synchronizing signal.

The video signal conversion circuit 210 has a non-illustrated selection circuit to select one of multiple video signals input from the external video signal input terminal 212 and digital video data input from the image reproduction module 30 and store the selected video data or signal into the frame memory 211. The selection of the analog video signal or the digital video data is carried out, for example, in response to an instruction from a non-illustrated external input device like a remote control or in response to an instruction from a second CPU 300 of the image reproduction module 30 discussed later.

The audio control circuit 220 drives a speaker 224 with a driving signal that is generated based on an audio signal or sound data transferred from an external audio signal input terminal 222 or a sound source 360, in response to an instruction output from the first CPU 200. Like the video signal conversion circuit 210, the audio control circuit 220 has a non-illustrated selection circuit to select one of multiple audio signals input from the external audio signal input terminal 222 and the sound data input from the sound source 360. The selection of the audio signal or the sound data is carried out according to the selection of the analog video signal input from the external video signal input terminal 212 or the digital video data supplied from the image reproduction module 30.

The liquid crystal panel driving circuit (LCD driving circuit) 230 receives video data processed by the video signal conversion circuit 210 and drives a liquid crystal panel (LCD) 232 according to the input video data to modulate light emitted from a light source 242. The light modulated by the LCD 232 is projected on a projection plane, for example, on a projection screen, via the projection optical system 260 including lenses. The light source 242 is connected with the light source control circuit 240, which controls on and off the light source 242 and regulates the quantity of light in response to an instruction output from the first CPU 200.

The image reproduction module 30 has a second CPU 300 that executes predetermined programs to control respective blocks included in the image reproduction module 30, a second ROM 302 that stores therein the programs executed by the second CPU 300, and a second RAM 304 that temporarily registers therein results of the operations executed by the second CPU 300 and data. The second CPU 300, the second ROM 302, and the second RAM 304 are mutually connected via a memory bus 306.

The image reproduction module 30 further includes an image transition controller (VSWCTL) 310, a PCMCIA interface controller (PCMCIA I/F CTL) 340, and the sound source 360. The respective blocks are connected to the second CPU 300 via a second system bus 308.

The PCMCIA interface controller (hereinafter simply referred to as the 'PCMCIA controller') 340 transfers data to and from an external device connecting with the image reproduction module 30 in conformity with the PCMCIA standard. The PCMCIA controller 340 is connected to a PC card 40 inserted in a non-illustrated card slot. The PC card 40 is a removable, small-sized portable recording medium in conformity with the PCMCIA standard. The small-sized portable recording medium is not restricted to the PC card, but may be any of diverse memory cards. In such a modified structure, the PCMCIA controller 340 is replaced by a controller corresponding to the applied memory card.

The image transition controller 310 executes a presentation tool stored in the second ROM 302 and supplies video data included in presentation data read from the PC card 40 to the video signal conversion circuit 210 in response to an instruction output from the second CPU 300. The details of the image transition controller 310 will be discussed later.

The sound source 360 generates sound data and transmits the generated sound data to the audio control circuit 220 of the projector module 20, in response to an instruction output from the second CPU 300.

The image reproduction module 30 is further connected to the first system bus 208 of the projector module 20 via a bus buffer 330 connecting with the second system bus 308. The first CPU 200 and the second CPU 300 can communicate with each other via the bus buffer 330. A circuit utilizing a dual port memory or an I/O interface may be applied for the bus buffer 330.

B. Construction of Image Transition Controller 310

Figure 2:
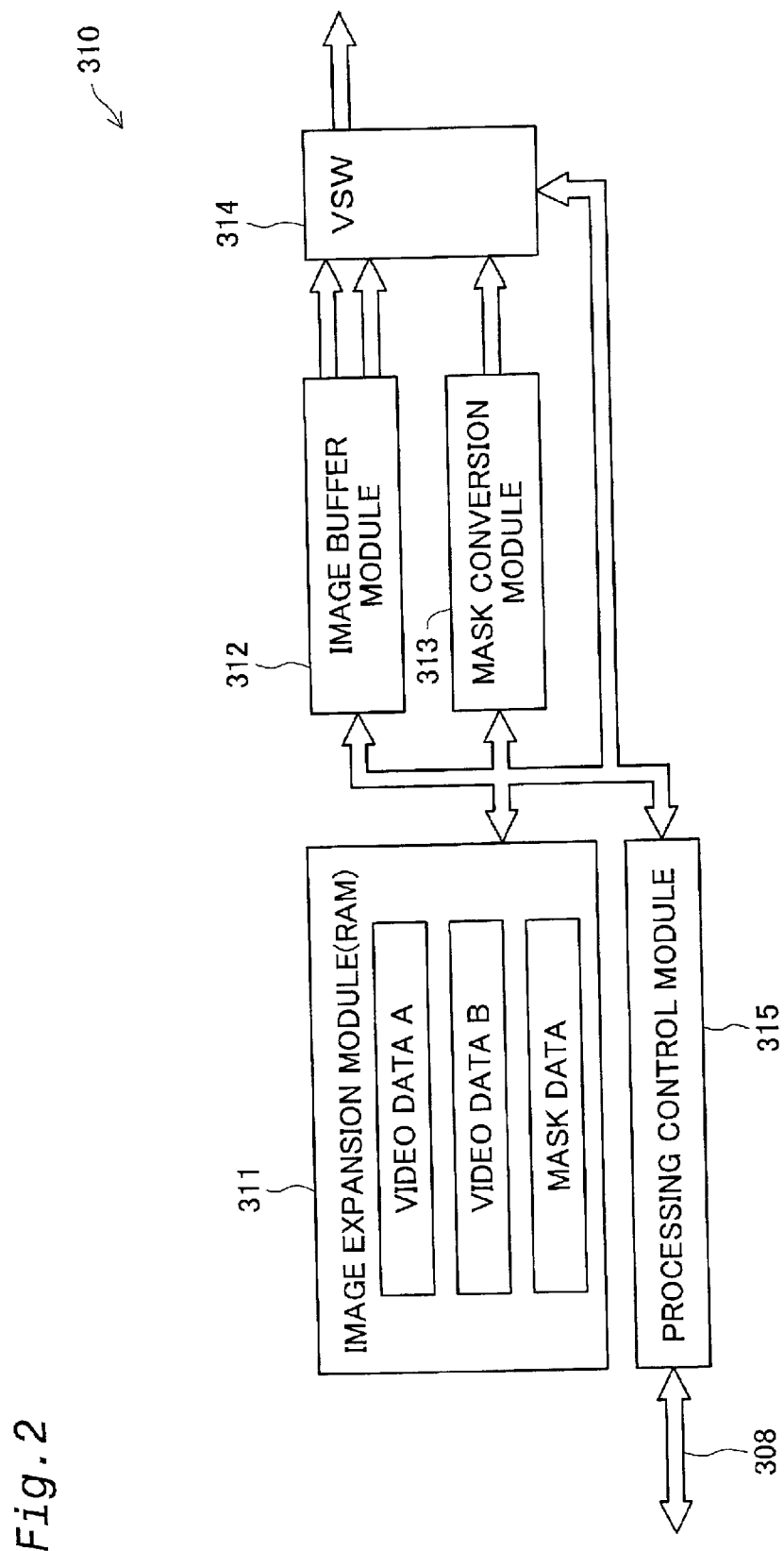
FIG. 2 is a block diagram illustrating an exemplified construction of an image transition controller 310.

FIG. 2 is a block diagram illustrating an exemplified construction of the image transition controller 310. The image transition controller 310 includes an image expansion module 311 functioning as the storage module of the present invention, an image buffer module 312, a mask conversion module 313 functioning as the selection data conversion module, an image transition module (VSW) 314, and a processing control module 315.

The processing control module 315 is connected to the second system bus 308 and controls the respective blocks included in the image transition controller 310.

The image expansion module 311 is actualized by a general RAM. Video data read from the PC card 40 is temporarily stored in the image expansion module 311. In the state of FIG. 2, video data representing a current on-screen image A (video data A) and video data representing a next on-screen image B (video data B) are stored.

In the case where the video data included in the presentation data stored in the PC card 40 is compressed video data, for example, on the basis of the PEG format, the second CPU 300 expands the compressed video data into video data of the BMP format before storage in the image expansion module 311.

The second CPU 300 also generates corresponding mask data according to desired image transition effects, and gains access to the image expansion module 311 to store the generated mask data.

The following describes the operations of the respective blocks included in the image transition controller 310 in the process of changing the display from the current on-screen image A to the next on-screen image B.

The RAM constructing the image expansion module 311 is generally not capable of reading the video data A, the video data B, and the mask data in parallel. The video data A, the video data B, and the mask data are accordingly read from the image expansion module 311 in time series, for example, in an order of 1) mask data, 2) video data A, 3) video data B. The image buffer module 312 buffers the preceding video data A and regulates the timings of outputting the video data A and the video data B to the image transition module 314. The video buffer module 312 is actualized by a general buffer circuit for regulating the output timings of video data.

One possible modification makes the image expansion module 311 consist of three RAMs to allow independent control of the video data A, the video data B, and the mask data. In this modified structure, the image buffer module 312 may be omitted.

The mask conversion module 313 converts mask data, which is equivalent to the base selection mask having a smaller size than that of video data, into conversion mask data, which is equivalent to the image selection mask of the present invention having the same size as that of video data. The procedures of generating and converting mask data depend upon the type of image transition effects (display effects) attained by image transition, for example, animation effects (slide-in, blinding, and checker wiping) by Power-Point.

The conversion mask data has one-to-one mapping to the respective pixels of the video data, and specifies which of two images is to be selected in each pixel. For example, data '1' represents selection of the first image, and data '0' represents selection of the second image.

The image transition module 314 fetches the conversion mask data from the mask conversion module 313 and the video data A and the video data B from the image buffer module 312 with regard to each pixel of video data output to the video signal conversion circuit 210. The image transition module 314 then outputs resulting video data (video data C) obtained by selecting video data mapped to the conversion mask data with regard to each pixel. The projector module 20 displays a resulting image according to the conversion mask data. Namely the procedure prepares mask data according to desired image transition effects and carries out image transition from the current on-screen image A to the next on-screen image B to gain the desired image transition effects.

C. Concrete Examples of Image Transition

The following describes the operations of the image transition controller 310 in the process of changing the display from the current on-screen image A to the next on-screen image B with a concrete example. FIG. 3 shows the current on-screen image A and the next on-screen image B as one example. FIG. 4 shows examples of mask data stored in the image expansion module 311.

Figure 3A:
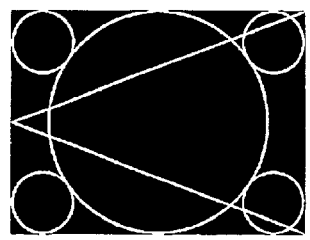
FIGS. 3(A) and 3(B) show a current on-screen image A and a next on-screen image B as one example.
Figure 3B:
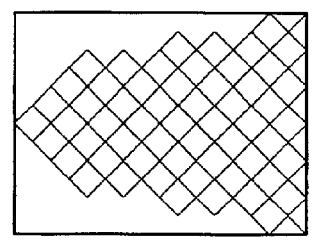

For the purpose of simplicity of explanation, it is assumed that the size of the display screen is 128×96 pixels and that the image A and the image B have the same size as that of the display screen as shown in FIGS. 3(A) and 3(B).

Figure 4A:
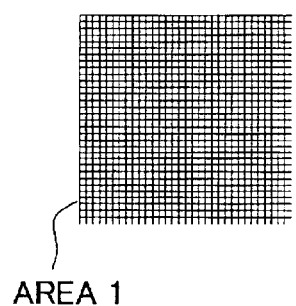
FIGS. 4(A) through 4(E) show examples of mask data stored in an image expansion module 311.
Figure 4B:
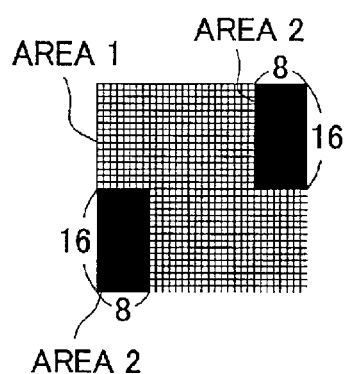
Figure 4C:
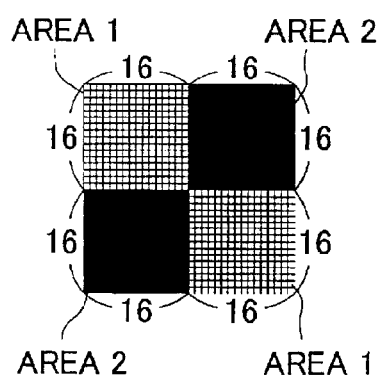
Figure 4D:
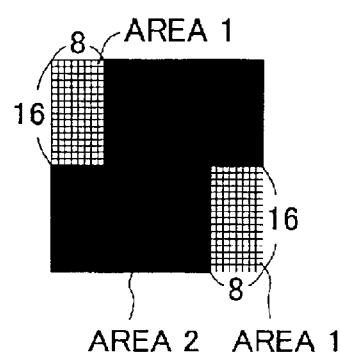
Figure 4E:
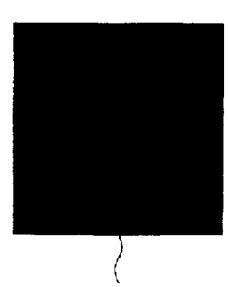

There are five available mask data (32×32 pixels), masks 1 to 5, shown in FIGS. 4(A) to 4(E). FIGS. 4(A) to 4(E) show the respective mask data as image information of the display. Each white pixel area represents an area of data '1' or a pixel area in which the first image is selected (Area 1). Each black pixel area represents an area of data '0' or a pixel area in which the second image is selected (Area 2). The mask 1 of FIG. 4(A) shows mask data in which the first image is selected in all pixels. The mask 2 of FIG. 4(B) shows mask data in which the second image is selected in Areas 2 of 8×16 pixels located on the upper right and the lower left corners and the first image is selected in the residual Area 1. The mask 3 of FIG. 4(C) shows mask data in which the second image is selected in Areas 2 of the upper right half (16×16 pixels) and the lower left half (16×16 pixels) and the first image is selected in Areas 1 of the upper left half (16×16 pixels) and the lower right half (16×16 pixels). The mask 4 of FIG. 4(D) shows mask data in which the first image is selected in Areas 1 of 8×16 pixels located on the upper left and the lower right corners and the second image is selected in the residual Area 2. The mask 5 of FIG. 4(E) shows mask data in which the second image is selected in all pixels.

These mask data are stored in the image expansion module 311 by the second CPU 300. All the mask data of FIGS. 4(A) to 4(E) may be stored in advance or may be stored sequentially in the process of image transition.

C1. Image Transition Example 1

FIG. 5 shows Image Transition Example 1. The drawings on the left column of FIG. 5 show conversion mask data corresponding to the display screen. The drawings on the right column show displayed images.

Figure 5A:
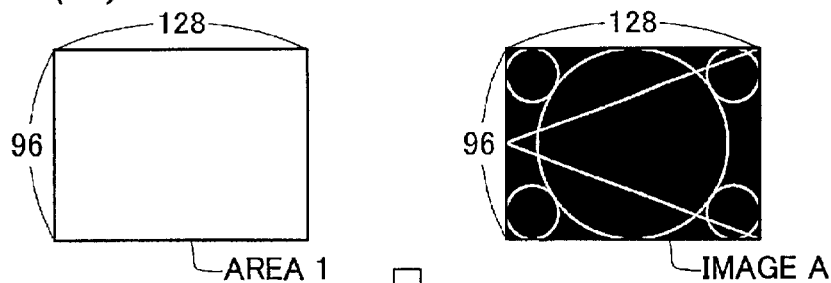
FIGS. 5(A) through 5(E) show Image Transition Example 1.
Figure 5B:
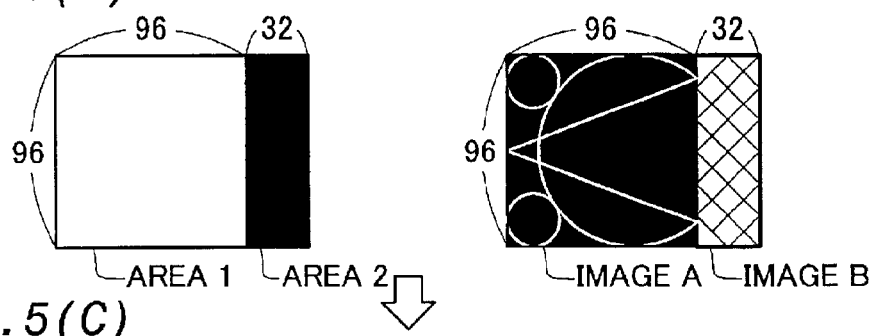
Figure 5C:
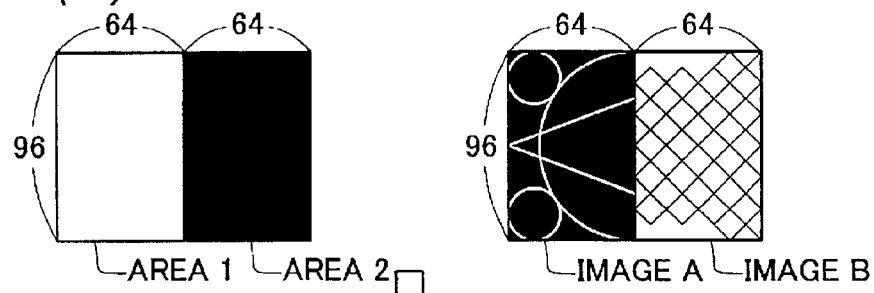
Figure 5D:
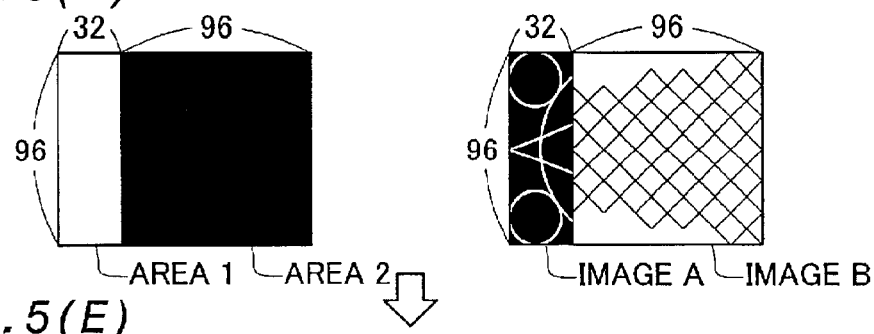
Figure 5E:
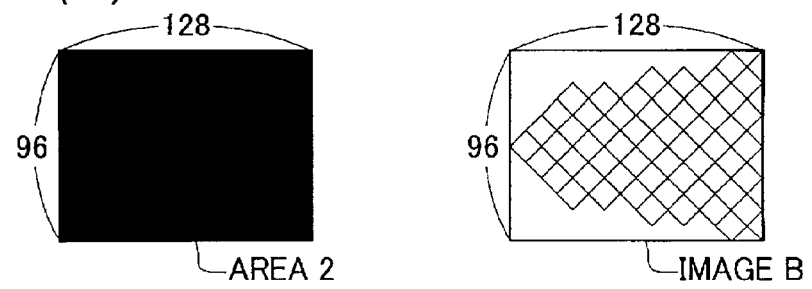

In this Image Transition Example 1, in the course of changing the display from the current on-screen image A shown in FIG. 5(A) to the next on-screen image B shown in FIG. 5(E), the display area of the image B is gradually increased by 32 pixels in the horizontal direction from the right side of the screen.

In the conversion mask data used here, Area 1 in which the second image is selected gradually increases by 32 pixels in the horizontal direction from the right side of Area 1 in which the first image is selected as shown in FIGS. 5(A) through 5(E).

Figure 6A:
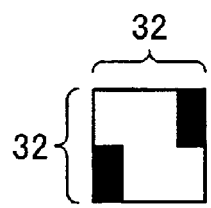
FIGS. 6(A) and 6(B) show a process of obtaining the conversion mask data of FIG. 5(B)
Figure 6B:
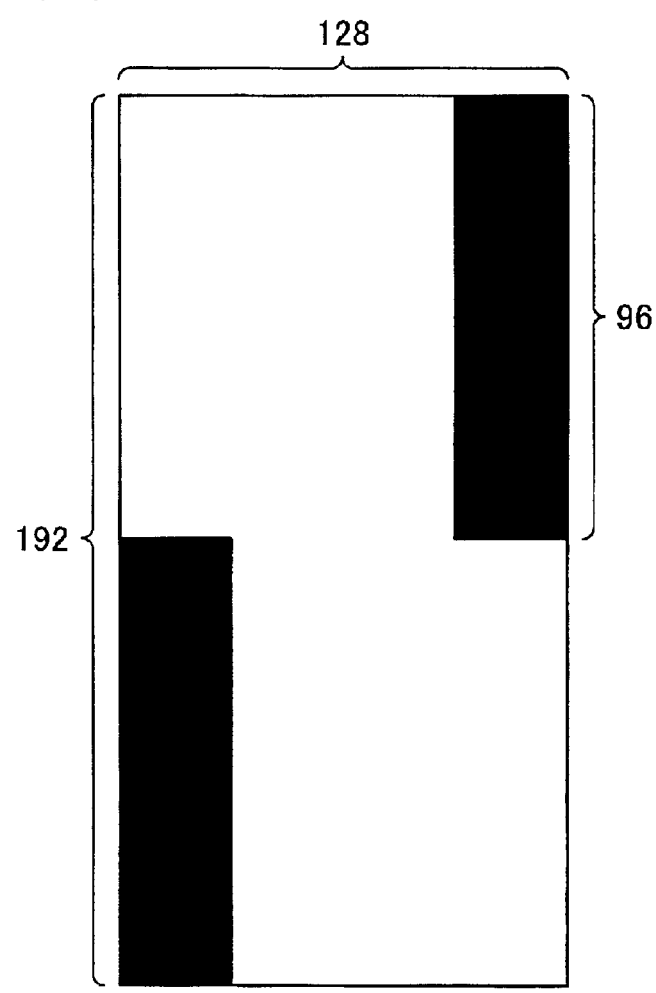

The respective conversion mask data of FIGS. 5(A) to 5(E) are obtained according to the following procedure. FIG. 6 shows a process of obtaining the conversion mask data of FIG. 5(B). The conversion mask data of FIG. 5(B) is generated by expanding mask data shown in FIG. 6(A) (this is identical with the mask 2 shown in FIG. 4(B)) four times in the horizontal direction and six times in the vertical direction as shown in FIG. 6(B) and cutting the upper half of the resulting data. Similarly, the other conversion mask data of FIGS. 5(A), 5(C), 5(D), and 5(E) are generated by expanding the mask data of FIGS. 4(A), 4(C), 4(D), and 4(E).

The image transition module 314 applies the images A and B respectively for the first image and the second image and enables transition of the display from the current on-screen image A to the next on-screen image B such that the display area of the image B is gradually increased by 32 pixels in the horizontal direction from the right side of the screen as shown in the right-side drawings of FIGS. 5(A) through 5(E).

In FIGS. 5(A) to 5(E), the image A displayed on the screen corresponding to Area 1 gradually disappears from the right side with a decrease in Area 1 from the right side. One possible modification may make the image A gradually disappear from the left side with a decrease in Area 1. The image B displayed on the screen corresponding to Area 2 gradually appears from the right side with an increase in Area 2 from the right side. One possible modification may make the image B gradually appear from the left side with an increase in Area 2. Such modification is attained by regulating the reading positions of the images A and B from the image expansion module 311. This arrangement further enhances the image transition effects (display effects) by the image transition utilizing the mask data.

The state of FIG. 5(A) shows only the image A, and the state of FIG. 5(E) shows only the image B. It is accordingly not necessary that the image transition module 314 uses the conversion mask data for selection of the image. One possible modification fixes the selection of the image in the image transition module 314, irrespective of the contents of the conversion mask data. Similar modification is also adopted in the following image transition examples.

C2. Image Transition Example 2

FIG. 7 shows Image Transition Example 2. The drawings on the left column of FIG. 7 show conversion mask data corresponding to the display screen. The drawings on the right column show displayed images.

Figure 7A:
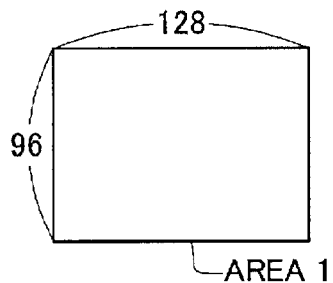
FIGS. 7(A) through 7(E) show Image Transition Example 2.
Figure 7A:
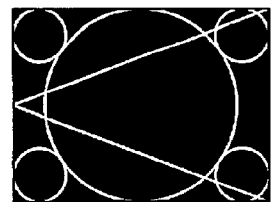
Figure 7B:
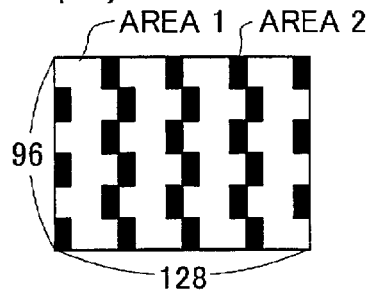
Figure 7B:
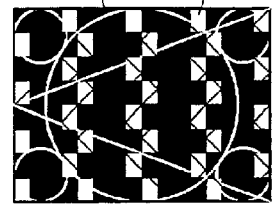
Figure 7C:
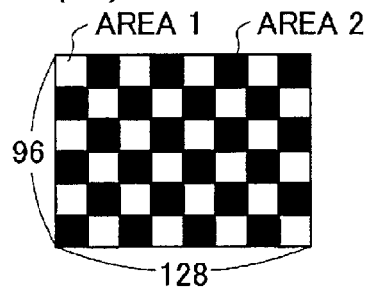
Figure 7C:
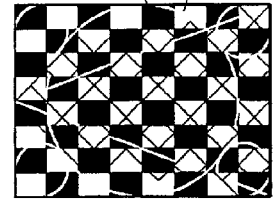
Figure 7D:
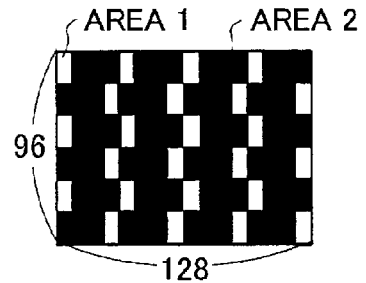
Figure 7D:
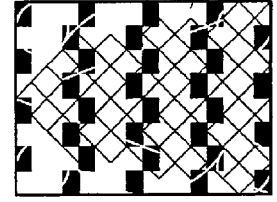
Figure 7E:
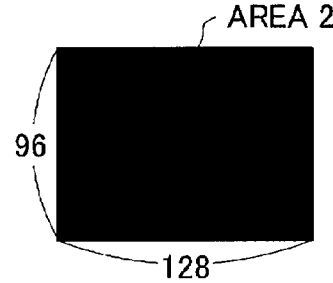
Figure 7E:
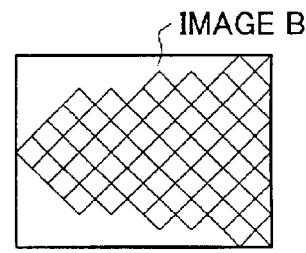

In this Image Transition Example 2, in the course of changing the display from the current on-screen image A shown in FIG. 7(A) to the next on-screen image B shown in FIG. 7(E), the display area of the image A decreases and the display area of the image B increases as shown in FIGS. 7(B) through 7(D) via the state in which the image A and the image B are displayed in a checker patter as shown in FIG. 7(C).

Figure 8A:
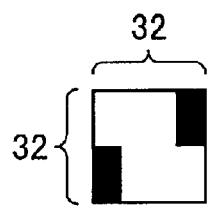
FIGS. 8(A) and 8(B) show a process of obtaining the conversion mask data of FIG. 7(B)
Figure 8B:
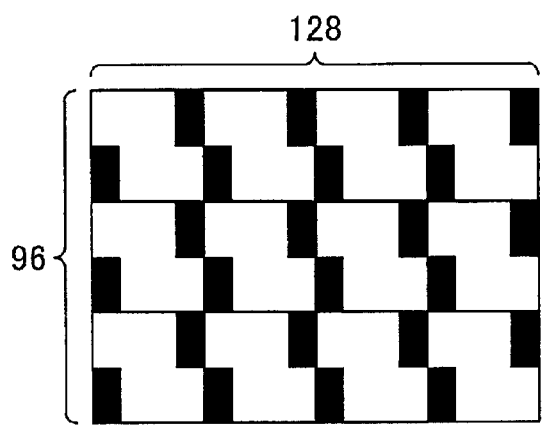

The respective conversion mask data of FIGS. 7(A) to 7(E) are obtained according to the following procedure. FIG. 8 shows a process of obtaining the conversion mask data of FIG. 7(B). The conversion mask data of FIG. 7(B) is generated by repeating mask data shown in FIG. 8(A) (this is identical with the mask 2 of FIG. 4(B)) four times in the horizontal direction and three times in the vertical direction in a two-dimensional manner. Similarly the other conversion mask data of FIGS. 7(A), 7(C), 7(D), and 7(E) are generated by repeating the mask data of FIGS. 4(A), 4(C), 4(D), and 4(E).

In FIGS. 7(A) through 7(E), the current on-screen image A displayed on the screen corresponding to Area 1 of the conversion mask data and the next on-screen image B displayed on the screen corresponding to Area 2 may be obtained by regulating the reading positions of the images A and B from the image expansion module 311, as discussed above in the modification of Image Transition Example 1.

C3. Image Transition Example 3

FIG. 9 shows Image Transition Example 3. The drawings on the left column of FIG. 9 show conversion mask data corresponding to the display screen. The drawings on the right column show displayed images.

Figure 9A:
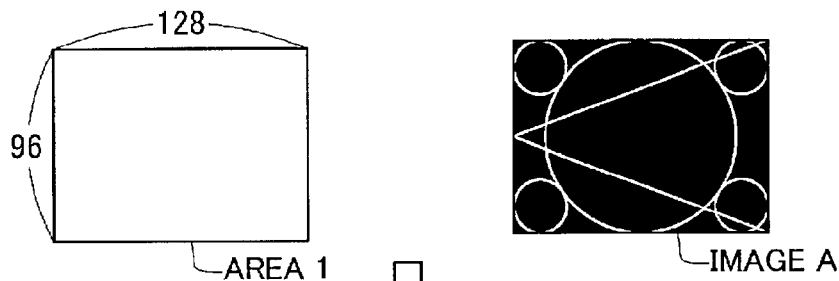
FIGS. 9(A) through 9(E) show Image Transition Example 3.
Figure 9B:
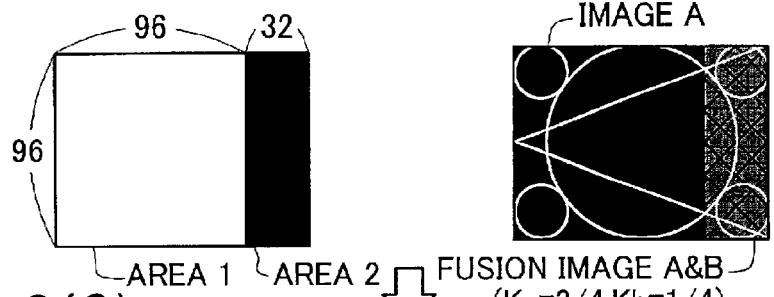
Figure 9C:
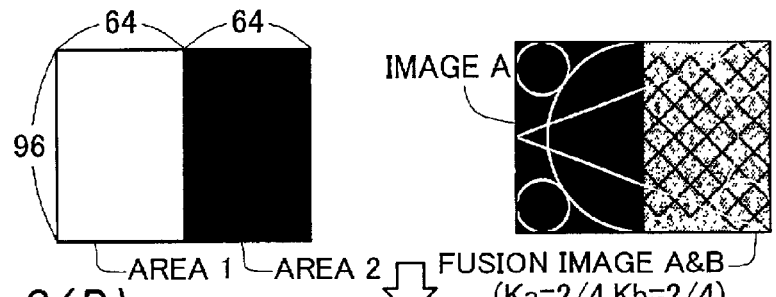
Figure 9D:
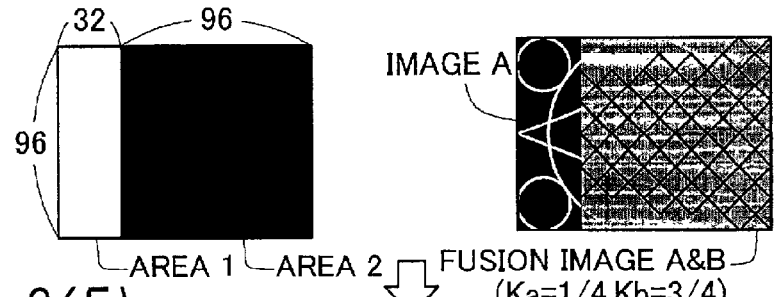
Figure 9E:
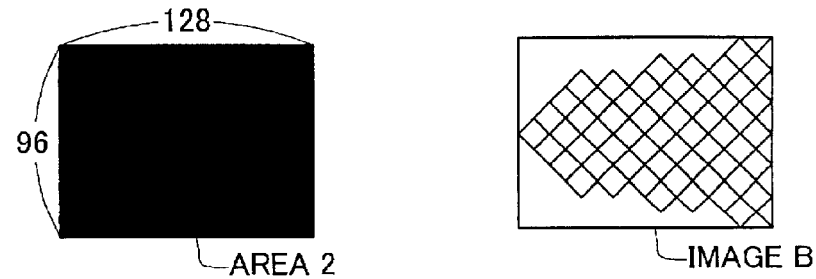

Image Transition Example 3 uses the conversion mask data used in Image Transition Example 1 to change the display from the current on-screen image A shown in FIG. 9(A) to the next on-screen image B shown in FIG. 9(E). This example is characterized by the second image displayed on the screen corresponding to Area 2 of the conversion mask data in the course of image transition, that is, in the state of FIGS. 9(B) through 9(D). More specifically, whereas the image B is displayed in Area 2 in Image Transition Example 1, a fusion image A&B as a mixture of the images A and B is displayed in Area 2 in this Image Transition Example 3.

The fusion image A&B is obtained by mixing the images A and B at a preset mixing ratio (Image A:Image B=Ka:Kb, Ka+Kb=1). The respective fusion images A&B of FIGS. 9(B) to 9(D) have different mixing ratios. More specifically, the fusion image A&B of FIG. 9(B) has Ka=3/4 and Kb=1/4. The fusion image A&B of FIG. 9(C) has Ka=2/4 and Kb=2/4. The fusion image A&B of FIG. 9(D) has Ka=1/4 and Kb=3/4. The image B of FIG. 9(E) corresponds to the fusion image A&B having Ka=0 and Kb=1. The image A may be a fusion image having Ka=1 and Kb–0, and the image B may be not the fusion image but a source image.

Varying the mixing ratio of the fusion image A&B displayed in Area 2 gradually fades the image A and enhances the image B as shown in FIGS. 9(B) through 9(D). This ensures the effect of making the image B appear out of the image A. This technique attains fade-in of the image when the image A is a monochromatic image, and fad-out of the image when the image B is a monochromatic image.

Image Transition Example 3 exerts the similar effect to that of Image Transition Example 1, that is, the effect of gradually increasing the display area of the next on-screen image B from the right side of the screen, and has the additional effect of making the image B appear out of the image A, which is ascribed to the use of the fusion image A&B.

C4. Image Transition Example 4

Figure 10A:
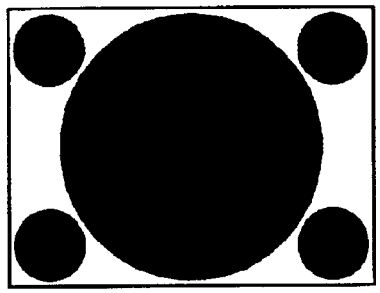
FIGS. 10(A) and 10(B) show the current on-screen image A and the next on-screen image B as another example.
Figure 10B:
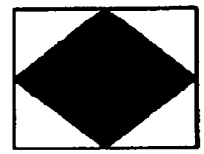

Image Transition Examples 1 through 3 regard the case in which the current on-screen image A and the next on-screen image B have the identical size with the size of the display screen. Image transition as discussed below is actualized in the case where the size of the image B is smaller than the size of the display screen. In the following discussion, it is assumed that the image A is an image of 128×96 pixels shown in FIG. 10(A) and the image B is an image of 64×48 pixels shown in FIG. 10(B).

FIG. 11 shows Image Transition Example 4. The drawings on the left column of FIG. 11 show conversion mask data corresponding to the display screen. The drawings on the right column show displayed images. Image Transition Example 4 applies the conversion mask data for the display area of the image B and sequentially changes the display as shown in FIGS. 11(B) through 11(D) to make the image B combined with at an arbitrary position of the image A of FIG. 11(A) as shown in FIG. 11(E).

Figure 12:
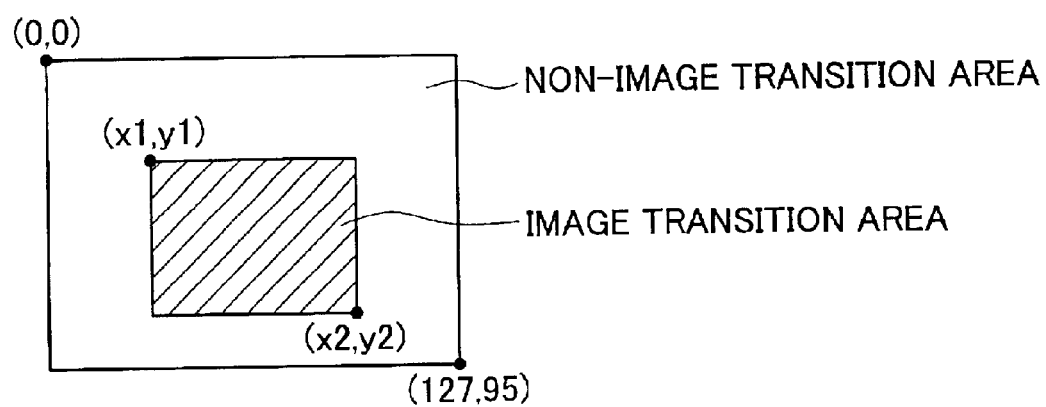
FIG. 12 shows a display area of the image B.

FIG. 12 shows a display area of the image B. Each display area of the image B is specified in advance by coordinate data (x,y) on the display screen. Coordinate data of the image B on the display screen is obtained by setting a desired display area of the image B. The procedure of this example sets an area defined by an upper left vertex (x1,y1) and a lower right vertex (x2,y2) as the display area of the image B, where the origin (0,0) is set on the upper left vertex of the display screen.

The display of the image A is kept irrespective of the image transition to the image B in the non-display area of the image B on the display screen, that is, in the area of x<x1, x>x2, y<y1, and y>y2. This area does not require image transition (that is, the non-image transition area). The image transition module 314 (see FIG. 2) is accordingly controlled not to carry out image transition according to the conversion mask data in this non-image transition area. The image transition module 314 is controlled, on the other hand, to carry out image transition according to the conversion mask data in the area of $x1 \leq x \leq x2$ and $y1 \leq y \leq y2$. The processing control module 315 carries out such setting of the image transition module 324.

Figure 11A:
FIGS. 11(A) through 11(E) show Image Transition Example 4.
Figure 11B:
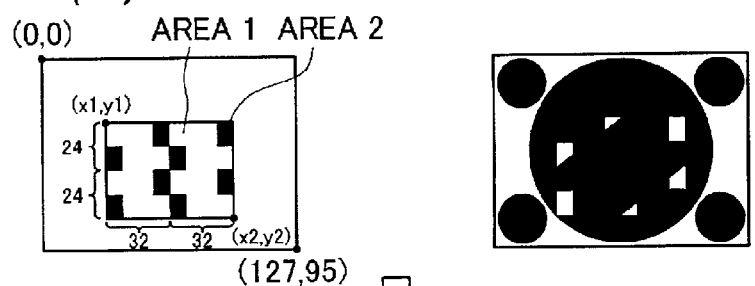
Figure 11C:
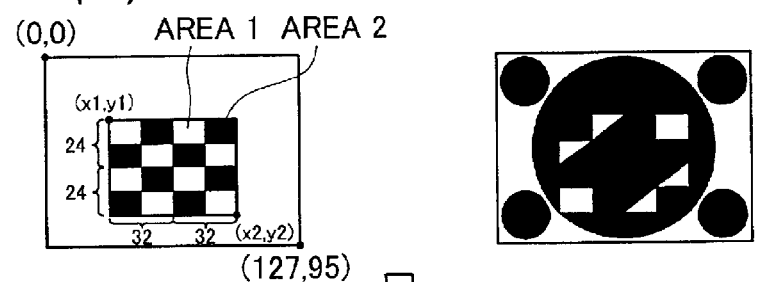
Figure 11D:
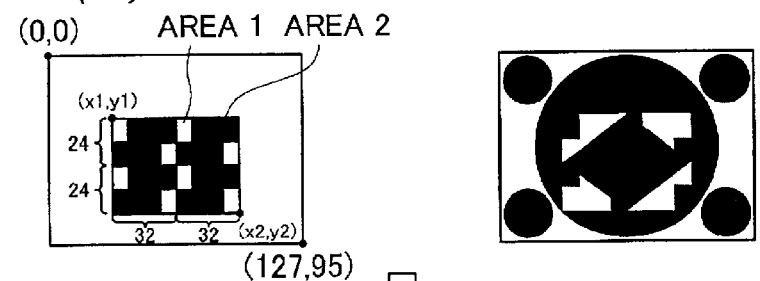
Figure 11E:
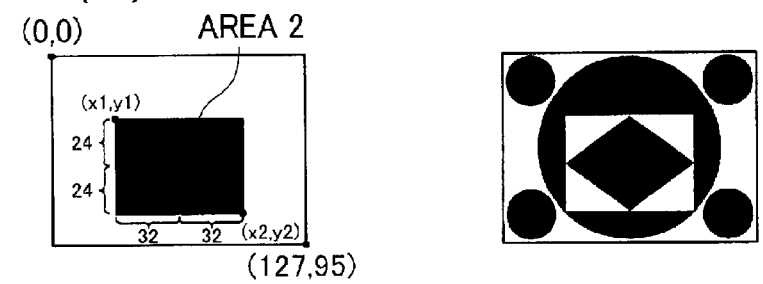
Figure 13A:
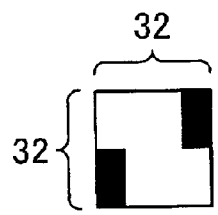
FIGS. 13(A) through 13(C) show a process of obtaining the conversion mask data of FIG. 11(B)
Figure 13B:
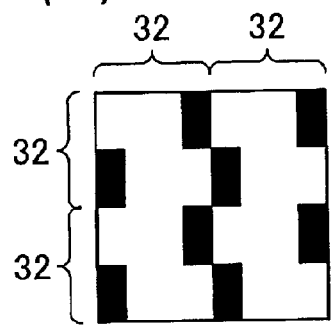
Figure 13C:
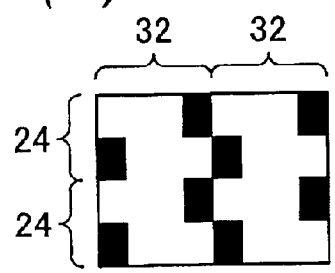

The respective conversion mask data of FIGS. 11(B) to 11(E) are obtained according to the following procedure. FIG. 13 shows a process of obtaining the conversion mask data of FIG. 11(B). Like Image Transition Example 2, this Image Transition Example 4 uses conversion mask data obtained by repeating the mask data in a two-dimensional manner. While the size of the image B is 64×48 pixels, the size of the mask data is 32×32 pixels as shown in FIG. 4. Simple repetition of the mask data accordingly does not give the conversion mask data. The process of this example thus generates the conversion mask data by combining the expansion/contraction of mask data with the repeating layout. A concrete procedure repeats mask data shown in FIG. 13(A) (this is identical with the mask 2 shown in FIG. 4(B)) twice in both the horizontal direction and the vertical direction in a two-dimensional manner as shown in FIG. 13(B). The procedure then multiplies the intermediate mask data shown in FIG. 13(B) by 3/4 times in the vertical direction as shown in FIG. 13(C). This gives the conversion mask data of FIG. 11(B). The other conversion mask data of FIGS. 11(C) and 11(D) are generated in a similar manner. The repetition layout and the expansion/conversion may be carried out in a reverse order.

After the image transition from the image A to the composite image of the images A and B (hereinafter referred to as the 'image C'), the display may further be changed to another image D (not shown). In such cases, one possible arrangement sets a storage area of the image D in the image expansion module 311 (see FIG. 2) and provides a buffer circuit in the image buffer module 312 for regulating the output timing of the image D to the image transition module 314. The image transition module 314 then carries out the image transition from the image C to the image D. Another possible arrangement applies the images C and D respectively for the current on-screen image and the next on-screen image and newly stores the video data of the images C and D in the image expansion module 311 to attain the image transition from the image C to the image D.

As discussed in Image Transition Example 4, the current on-screen image and the next on-screen image may have different sizes. The image transition can be attained by utilizing the mask data even when the next on-screen image is smaller in size than the current on-screen image.

The procedure of generating the conversion mask data is not restricted to the expansion/contraction or the repeating layout but may be any combination thereof. This allows conversion mask data according to desired image transition effects to be generated by utilizing mask data of a smaller size than that of the conversion mask data, thus attaining diverse image transition effects.

As described above, the projector 10 of the embodiment converts mask data having a smaller size than that of video data into conversion mask data having the same size as that of the video data, and uses the conversion mask data to change the display from the current on-screen image A to the next on-screen image B, thus attaining image transition according to the conversion mask data.

The mask data stored in the image expansion module 311 has a smaller size than that of the video data. Compared with the prior art technique that uses the mask data having the same size as that of the video data, this technique advantageously reduces the storage capacity required for storing the mask data and relieves the loading of the second CPU 300 required for storing the mask data into the image expansion module 311. This arrangement thus ensures high-speed image transition to attain desired display effects (image transition effects).

D. Modifications

The present invention is not restricted to the above embodiment and examples, but there may be many modifications, changes, and alterations without departing from the scope or spirit of the main characteristics of the present invention. Some examples of possible modification are given below.

D1. Modification 1

Figure 14:
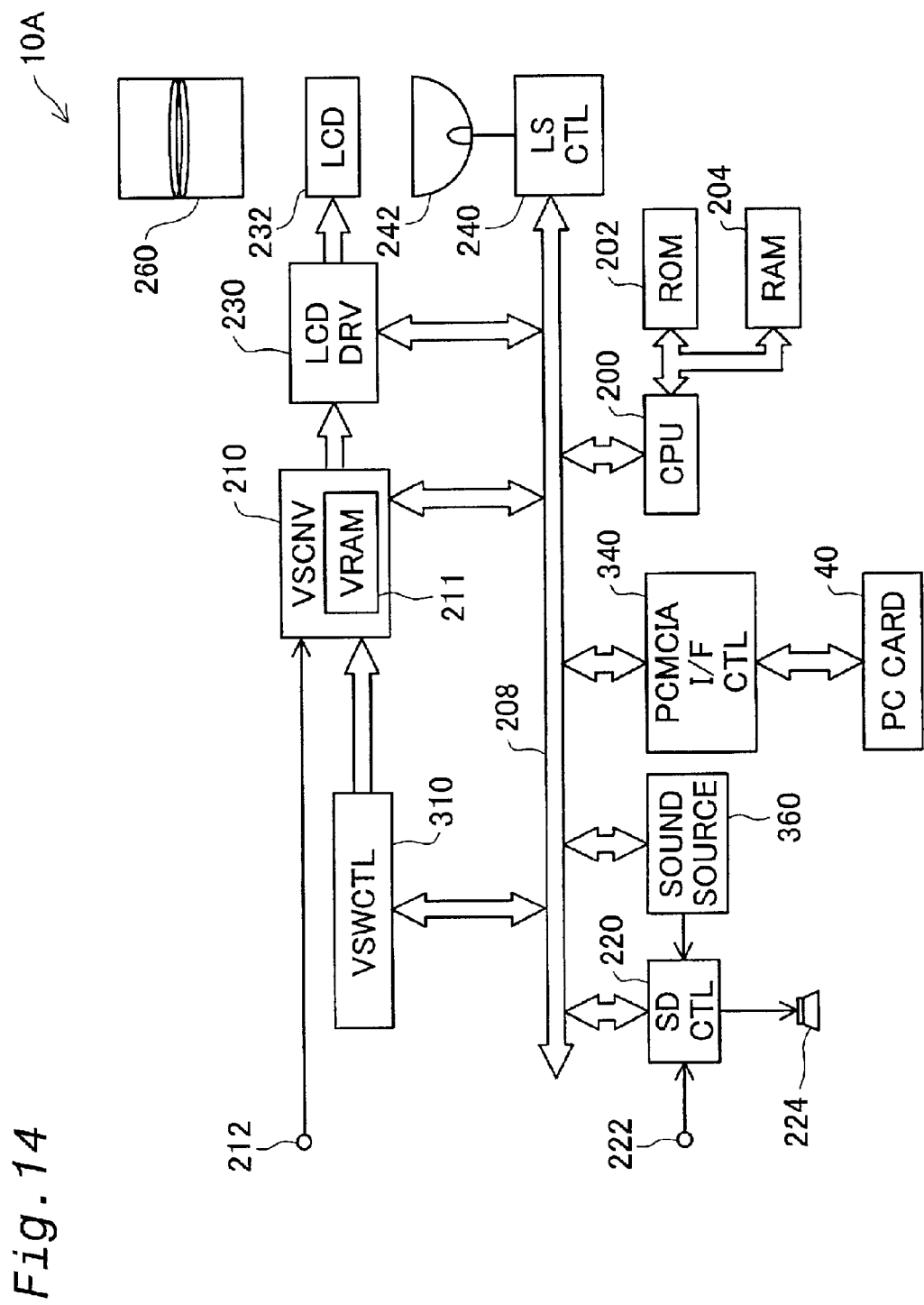
FIG. 14 is a block diagram illustrating a possible modification of the projector 10.

FIG. 14 is a block diagram illustrating a possible modification of the projector 10. This modified projector 10A excludes the second CPU 300, the second ROM 302, the second RAM 304, and the bus buffer 330 from the projector 10 of the embodiment and has the PCMCIA controller 340, the image transition controller 310, and the sound source 360 connecting with the first system bus 208. This projector 10A has the simplified structure by making the first CPU 200, the first ROM 202, and the first RAM 204 attain the functions of the second CPU 300, the second ROM 302, and the second RAM 304.

In the projector of the simplified structure, the image transition controller 310 may be incorporated in the video signal conversion circuit 210.

In another possible modification, the video signals input from the external video signal input terminal 212 may be supplied to the mage transition controller 310 after conversion to digital video data. This arrangement gives the image transition effects not only to the image expressed by the video data included in the presentation data read from the PC card but to the image expressed by the video signal input from the external video signal input terminal 212.

D2. Modification 2

The above embodiment regards the projector. The technique of the present invention is, however, not restricted to the projector but may be applicable for any image display apparatus having an image reproduction module.

What is claimed is:

1. An image display apparatus, comprising:
   an image display unit; and
   an image reproduction module that generates display video data, which is to be displayed on the image display unit,
   the image reproduction module having an image transition controller that uses a predetermined image selection mask to process a first image and a second image and thereby generate the display video data in the case of changing display on the image display unit from the first image to an image including the second image in at least part of a display area of the first image,
   wherein the image transition controller comprises:
   a storage module that stores therein the first image, the second image, and a base selection mask having an image area of a smaller size than the at least part of the display area, wherein the image area comprises a first area in which the first image is selected and a second area in which the second image is selected; and
   a selection mask conversion module that converts the base selection mask into the image selection mask having an image area of an identical size with the at least part of the display area,
   wherein the selection mask conversion module obtains the image selection mask by setting the base selection mask as one block data and repeating the block data in a two-dimensional manner.

2. An image display apparatus in accordance with claim 1, wherein the selection mask conversion module obtains the image selection mask through expansion/contraction of the base selection mask.

3. An image display apparatus in accordance with claim 1, wherein the image reproduction module further comprises an interface that is capable of reading data stored in a portable recording medium, and
   at least one of video data representing the first image and the second image is read from a recording medium connected to the interface.

* * * * *